(12) United States Patent
Pistoia et al.

(10) Patent No.: US 9,705,910 B2
(45) Date of Patent: *Jul. 11, 2017

(54) TESTING WEB APPLICATIONS FOR SECURITY VULNERABILITIES WITH METAREQUESTS

(71) Applicant: International Business Machines Corporation, Armonk, NY (US)

(72) Inventors: Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,419

(22) Filed: Apr. 14, 2016

(65) Prior Publication Data

US 2016/0234246 A1  Aug. 11, 2016

Related U.S. Application Data

(63) Continuation of application No. 14/103,221, filed on Dec. 11, 2013, now Pat. No. 9,363,284.

(51) Int. Cl.
*G06F 21/00* (2013.01)
*H04L 29/06* (2006.01)
*H04L 29/08* (2006.01)

(52) U.S. Cl.
CPC .......... *H04L 63/1433* (2013.01); *H04L 67/02* (2013.01); *H04L 63/168* (2013.01)

(58) Field of Classification Search
CPC .... H04L 63/1433; H04L 67/02; H04L 63/168
See application file for complete search history.

(56) References Cited

U.S. PATENT DOCUMENTS 7,673,189 B2    3/2010  Duyanovich et al.
2004/0002907 A1 1/2004  Tosswill
(Continued)

FOREIGN PATENT DOCUMENTS

CN    102141956 A    8/2011
EP    2354994        8/2011

OTHER PUBLICATIONS

Tripp et al., "Finding Your Way in the Testing Jungle a Learning Approach to Web Security Testing," SSTA '13, Jul. 15U" 20, 2013, Lugano, Switzerland.
(Continued)

*Primary Examiner* — Mahfuzur Rahman
*Assistant Examiner* — Narciso Victoria
(74) *Attorney, Agent, or Firm* — Harrington & Smith; Daniel P. Morris (57) ABSTRACT

A method includes instantiating, in response to a request by an executing application, an input data object with one or more uninitialized fields and traversing a path toward a sink in the executing application to a branching point of the executing application. In response to reaching the branching point, one or more parameters are provided for some or all of the one or more uninitialized fields of the input data object, wherein the one or more parameters were determined prior to beginning of execution of the executing application to cause a branch to be taken by the executing application toward the sink. The path is traversed toward the sink at least by following the branch in the executing application. Apparatus and computer program products are also disclosed.

18 Claims, 5 Drawing Sheets

(56) References Cited

U.S. PATENT DOCUMENTS

| | | |
|---|---|---|
| 2005/0177635 A1 | 8/2005 | Schmidt et al. |
| 2006/0253739 A1 | 11/2006 | Godefroid et al. |
| 2011/0055813 A1 | 3/2011 | Calendino et al. |
| 2011/0131656 A1 | 6/2011 | Haviv et al. |
| 2011/0191855 A1 | 8/2011 | De Keukelaere et al. |
| 2014/0047538 A1 | 2/2014 | Scott et al. |
| 2014/0082739 A1 | 3/2014 | Chess et al. |
| 2014/0189875 A1* | 7/2014 | Beskrovny ............ G06F 21/577 726/25 |

OTHER PUBLICATIONS

Hambartsumyan. Precise XSS Detection with Static Analysis using String Analysis. Diss. Eindhoven University of Technology, 2011.
Comparetti et al., "Prospex: Protocol Specification Extraction," 2009 30th IEEE Symposium on Security and Privacy.
Hewlett-Packard Development Company LP, "HP Fortify Software Security Center Proactively Eliminate Risk in Software" 2011.
Song et al., "Checking Policy Enforcement in an Access Control Aspect Model," CTIC'07 Anaheim, California, USA.
International Business Machines, "Close encounters of the third kind: A look at the prevalence of client-side JavaScript vulnerabilities in web applications", White Paper, 2010.
Penetration Testing Lab, "Web application fingerprinting", from http://pentestlab.wordpress.com/2012/08/01/web-application-fingerprinting/, downloaded on Oct. 8, 2013.
Hewlett Packard, "HP Fortify Software Security Center: Proactively Eliminate Risk in Software", 2011.
XSS Analyzer Gives You 700 Million Reasons to Feel Secure, Jul. 2, 2012.

\* cited by examiner

FIG. 1B

```
String username = request.getParameter("name"); // SRC
// Go to false branch, which may lead to a security sink.
if (username.length() < 6) {
    return errorPage();
} else {
    String lastname = request.getParameter("familyname"); // SRC
    if (!lastname.contains("<script>")) { // Instantiate with a payload like "<ScRipT>"
        response.getWriter().write("Welcome, Mr. " + lastname); // SNK
    }
}
```

TESTING WEB APPLICATIONS FOR SECURITY VULNERABILITIES WITH METAREQUESTS

CROSS REFERENCE TO RELATED APPLICATION

This Application is a continuation of U.S. patent application Ser. No. 14/103,221 (filed on Dec. 11, 2013) which is hereby incorporated by reference in its entirety.

BACKGROUND

This invention relates generally to analysis of program code and, more specifically, relates to static and run-time analysis of program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Statistics on the security status of web applications are alarming. There are approximately 100,000 vulnerability reports each year, and the trend is growing. A recent IBM (International Business Machines) study has shown 40 percent of Fortune 500 web applications to be vulnerable. See International Business Machines, "Close encounters of the third kind: A look at the prevalence of client-side JavaScript vulnerabilities in web applications", White Paper, 2010. This unfortunate situation places a high motivation on the problem of security testing of web applications.

There is a rich and diverse landscape of testing techniques with different sources of sophistication. These include, for example, the following: usage of static analysis to guide testing (see Hewlett Packard, "HP Fortify Software Security Center: Proactively Eliminate Risk in Software", 2011); feedback-based testing based on past tests that have failed (see "XSS Analyzer Gives You 700 Million Reasons To Feel Secure", Jul. 2, 2012); as well as testing based on fingerprinting hints (e.g., heuristic attempts to guess which frameworks and backend databases the application uses) (see "Web Application Fingerprinting", from the Penetration Testing Lab).

A main disadvantage of all these techniques is that each testing round must complete, yielding concrete feedback (e.g., in the form of a response from the application under test), before the testing system can decide on the next step in its testing strategy. Specifically, a test that has left the testing system has a fixed, fully specified behavior, which may lead to multiple test rounds before the system converges on an appropriate test for demonstrating a vulnerability.

BRIEF SUMMARY

The following summary is merely intended to be exemplary. The summary is not intended to limit the scope of the claims.

A method includes instantiating, in response to a request by an executing application, an input data object with one or more uninitialized fields and traversing a path toward a sink in the executing application to a branching point of the executing application. In response to reaching the branching point, one or more parameters are provided for some or all of the one or more uninitialized fields of the input data object, wherein the one or more parameters were determined prior to beginning of execution of the executing application to cause a branch to be taken by the executing application toward the sink. The path is traversed toward the sink at least by following the branch in the executing application. Apparatus and computer program products are also disclosed.

BRIEF DESCRIPTION OF THE SEVERAL VIEWS OF THE DRAWINGS

FIG. 3, including

DETAILED DESCRIPTION

As stated above, a main disadvantage of all the techniques described above is that each testing round must complete, yielding concrete feedback before the testing system can decide on the next step in its testing strategy. By contrast, using an approach described herein, a test request can have an "underspecified" behavior: Rather than simply being a concrete request with concrete parameter values, the test request can "materialize" as the test request progresses through the target program, thereby becoming a "metarequest". An importance of leaving test request behaviors (such as exact parameter values) initially unspecified is that based on the flow of processing of the request, these values can be determined on-the-fly so as to maximize the likelihood of demonstrating a vulnerability. In an exemplary proposed approach, "rules" on how to materialize the request result from static analysis of the target application.

Figure 1A:
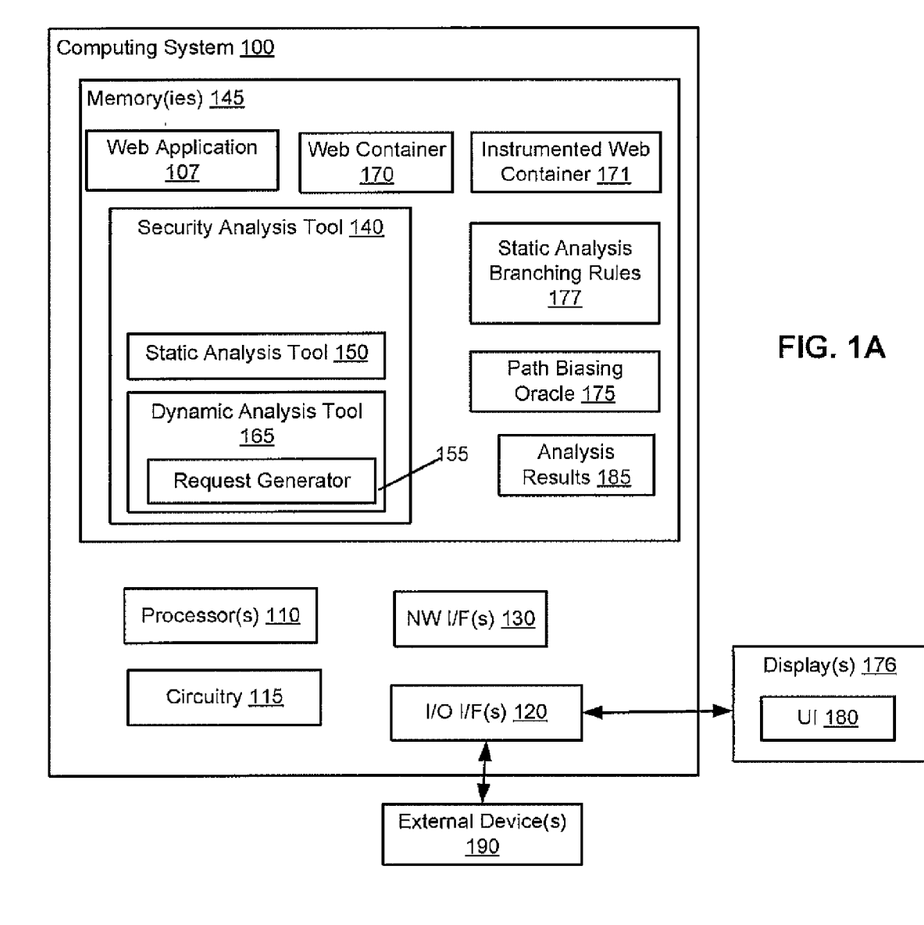
FIG. 1A is a block diagram of an example of a system suitable for performing the exemplary embodiments herein.

Additional description of the exemplary embodiments is presented in reference to the figures. Referring to FIG. 1A, this figure provides an overview of a computing system 100 suitable for use with exemplary embodiments herein. The computing system 100 comprises one or more memories 145, one or more processors 110, one or more I/O interfaces 120, and one or more wired or wireless network interfaces 130. Alternatively or in addition to the one or more processors 110, the computing system 100 may comprise circuitry 115. The computing system 100 is coupled to or includes one or more displays 176 and one or more external device(s) 190. In one example, the one or more memories 145 comprise a web application 107, a web container 170, an instrumented web container 171, static analysis branching rules 177, a path biasing oracle 175, analysis results 185, and a security analysis tool 140. The security analysis tool 140 includes a static analysis tool 150, and a dynamic analysis tool 165. The security analysis tool 140, in an exemplary embodiment, is implemented via computer-readable program code that is executable by the one or more processors 110 to cause the computing system 100 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing units, such as digital signal processors and/or single-core or multi-core general purpose processors. The circuitry 115 may be any electronic circuit such as an application specific integrated circuit or programmable logic. The memories 145 may comprise non-volatile and/or volatile RAM (random access memory), cache memory, NAND-based flash memory, long term storage (e.g., hard drive), and/or read only memory. The one or more I/O interfaces 120 may include interfaces through which a user may interact with the computing system 100. The display(s) 176 may be a touchscreen, flatscreen, monitor, television, projector, as examples.

A user interacts with the security analysis tool 140 through the UI (user interface) 180 on the display 176 in an exemplary embodiment or through the network interface(s) 130 in another non-limiting embodiment. The external device(s) 190 enable a user to interact in one exemplary embodiment with the computing system 100 and may include a mouse, trackball, keyboard, touch screen and the like. The network interfaces 130 may be wired and/or wireless and may implement a number of protocols, such as cellular or local area network protocols. The elements in computing system 100 may be interconnected through any technology, such as buses, traces on a board, interconnects on semiconductors, and the like.

In this example, the security analysis tool 140 includes a static analysis tool 150 that performs a static analysis on the web application 107. Although a web application is described herein, the techniques presented herein are useful for any type of application having sources and sinks. A static analysis is an analysis of a program such as web application 107 performed without executing the program and, instead, performed by analyzing the code (e.g., source, object code) of the program and modeling operation of the program. There are many tools that can perform static analysis. For example, International Business Machines (IBM) has a number of tools for static analysis of programs such as web applications. One such tool is called Rational Appscan. Many other static analysis tools exist.

Illustratively, the security analysis tool 140 includes a dynamic analysis tool 165, which includes a request generator portion 155. Dynamic analysis is a technique where an executing program, such an executing web application 107, is examined for vulnerabilities. There are many tools currently available for dynamic analysis of programs. One example is IBM's Rational Appscan.

An approach includes the following. This exemplary and brief approach is illustrated using FIG. 1B, which is a logic diagram of the system of FIG. 1A in an exemplary embodiment.

Figure 1B:
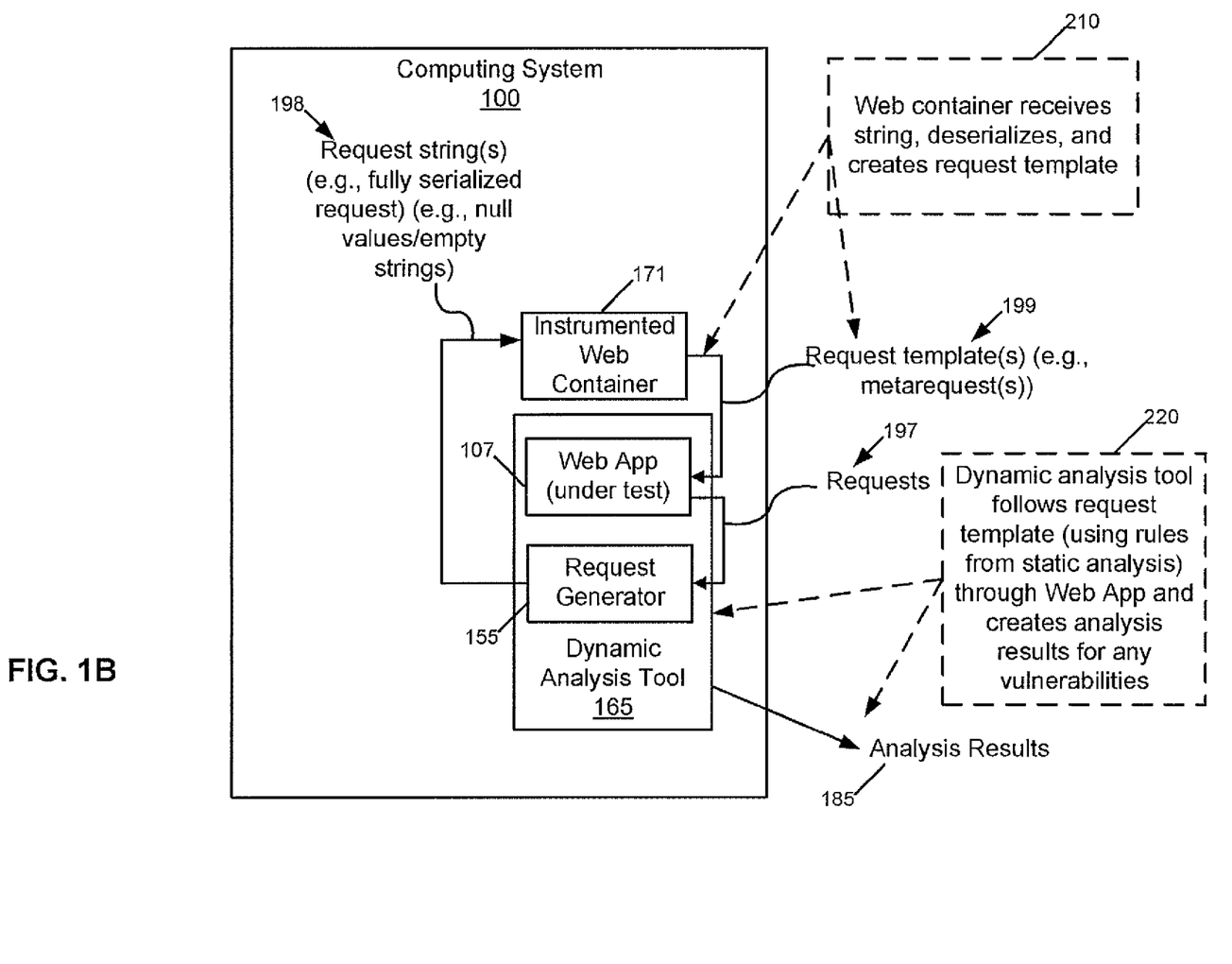
FIG. 1B is a logic diagram of the system of FIG. 1A in an exemplary embodiment.

1) A space of "instantiation possibilities" is defined for request parameters, whereby an unspecified parameter can become concrete. Into this is interleaved some class of security-relevant tokens (e.g., <script> for cross-site scripting, XSS, test payloads). In an exemplary embodiment, the instantiation possibilities are knowledge that is packaged into the tool (e.g., one or both of the security analysis tool 140 or the static analysis tool 150). This allows options that are security relevant to be considered, especially since a security expert may contribute to the knowledge. However, other options are possible, such as having a user select some or all of the instantiation possibilities.

2) Static analysis is performed over control-flow branching points in the target web application 107 to decide locally for different configurations of instantiation possibilities which branch to take and how to instantiate relevant parameters. The static analysis creates the static analysis branching rules 177.

3) The web container 170 is instrumented to create the instrumented web container 171, such that instead of deserializing the incoming HTTP (hyper text transfer protocol) traffic (shown as a request string 198) from a "client" side into a standard request object, a request "template" 199 will be created.

4) The request template 199 is allowed to materialize into a concrete request gradually as the request template progresses through the control flow of the target web application 107 while being informed by the static analysis branching rules 177 computed (in 2) by the static analysis.

More specifically, the logic diagram of FIG. 1B is typically performed in a "black box", such that analysis occurs without contact with the "outside world". Because of this, "client" requests illustrated by request strings 198 are created by a request generator portion 155 in response to a request 197 by the executing web application (app) 107. The requests 197 are created by source statements in the application. The "client" requests are formed typically in a fully serialized request string 198, although other inputs are possible. Instead of being a true request with data that would be input from users. the request strings 198 contain null values, thus being empty strings. The instrumented web container 171 receives the (e.g., serialized) request string 198, deserializes the request string 198 (if necessary), and creates one or more request templates 199. See block 210. The request templates 198 may be considered metarequests, since they are uninitialized to begin with and values for the request templates 198 materialize over time.

As the web application 107 executes, the dynamic analysis tool 165 responds to requests from the web application 107 by generating, using the request generator portion 155, additional request strings 198. Additionally, the dynamic analysis tool 165 follows request templates 199 (using rules from static analysis) through the web application 107 and creates analysis results 185 for any vulnerabilities. See block 220. These concepts are described in more detail below.

Figure 2:
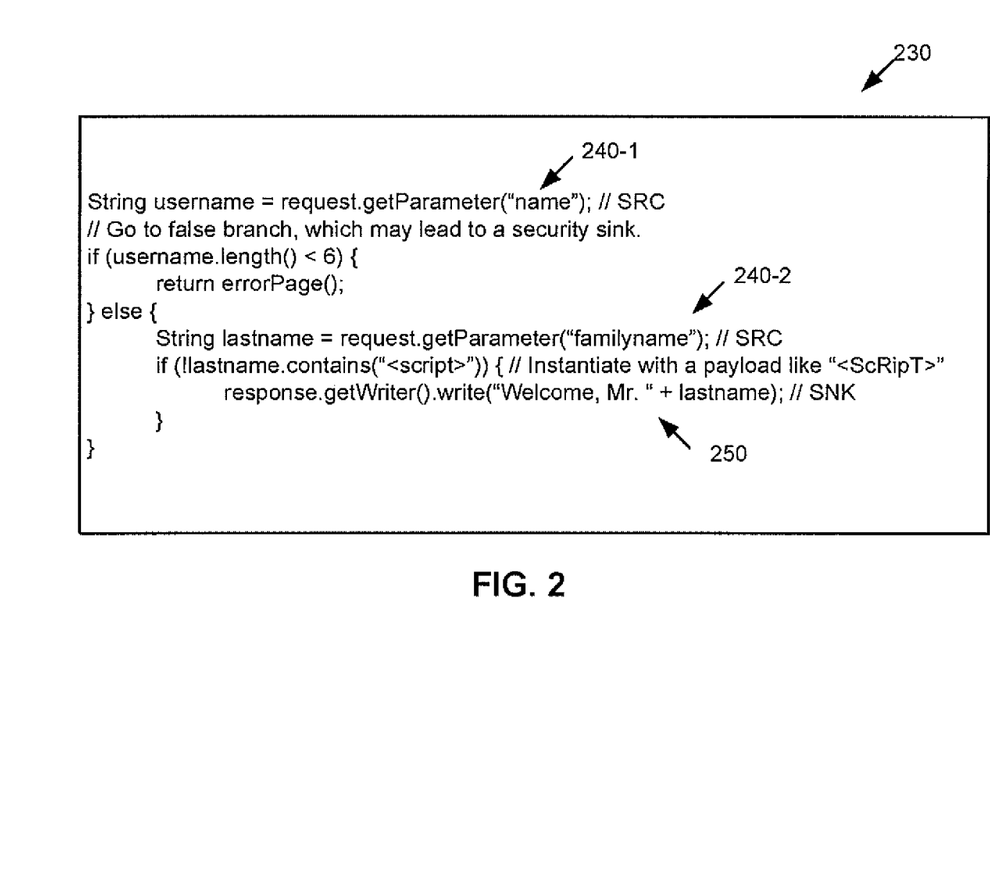
FIG. 2 is a simple example of program code in Java used to illustrate a vulnerability and exemplary approaches applied by exemplary embodiments herein.

An exemplary approach is illustrated through a simple example in Java syntax, which is shown in FIG. 2. Java is a programming language and computing platform first released by Sun Microsystems in 1995. The code 230 is a portion of a web application 107, has a number of statements, and is vulnerable. There are two sources, getParameter 240-1 (of "request.getParameter("name") and getParameter 240-2 (of "request.getParameter("familyname")), and one sink 250 getWriter. A source 240 is a statement reading (untrusted) user-provided data. A source 240 creates one or more requests 197. A sink (SNK) 250 is a statement performing a security-sensitive operation with content provided to the sink 250. There is a flow (that is, a path) from the getParameter source 240-2 (where source is abbreviated as "SRC") reading the value of the "familyname" user-provided HTTP parameter to the PrintWriter.write sink (which renders content to the response HTML). The content is "Welcome, Mr." and whatever is in the object lastname. Further, if the input payload contains a script block like "ScRiPT" (where the characters are not all in lower case), then the case-sensitive check over lastname (incorrectly) succeeds. Thus, there is a vulnerability for XSS (cross-site scripting). Cross-site scripting is a type of computer security vulnerability typically found in web applications. XSS enables attackers to inject client-side script into web pages viewed by other users. A cross-site scripting vulnerability may be used by attackers to bypass access controls. Analysis of code 230 in order, e.g., to indicate a vulnerability at the sink response.getWriter( ).write("Welcome, Mr."+lastname) and its corresponding statement is further described in reference to FIG. 3. An indication of the vulnerability may be output, e.g., to memory 145, to UI 180, or to network interface(s) 130.

Figure 3A:
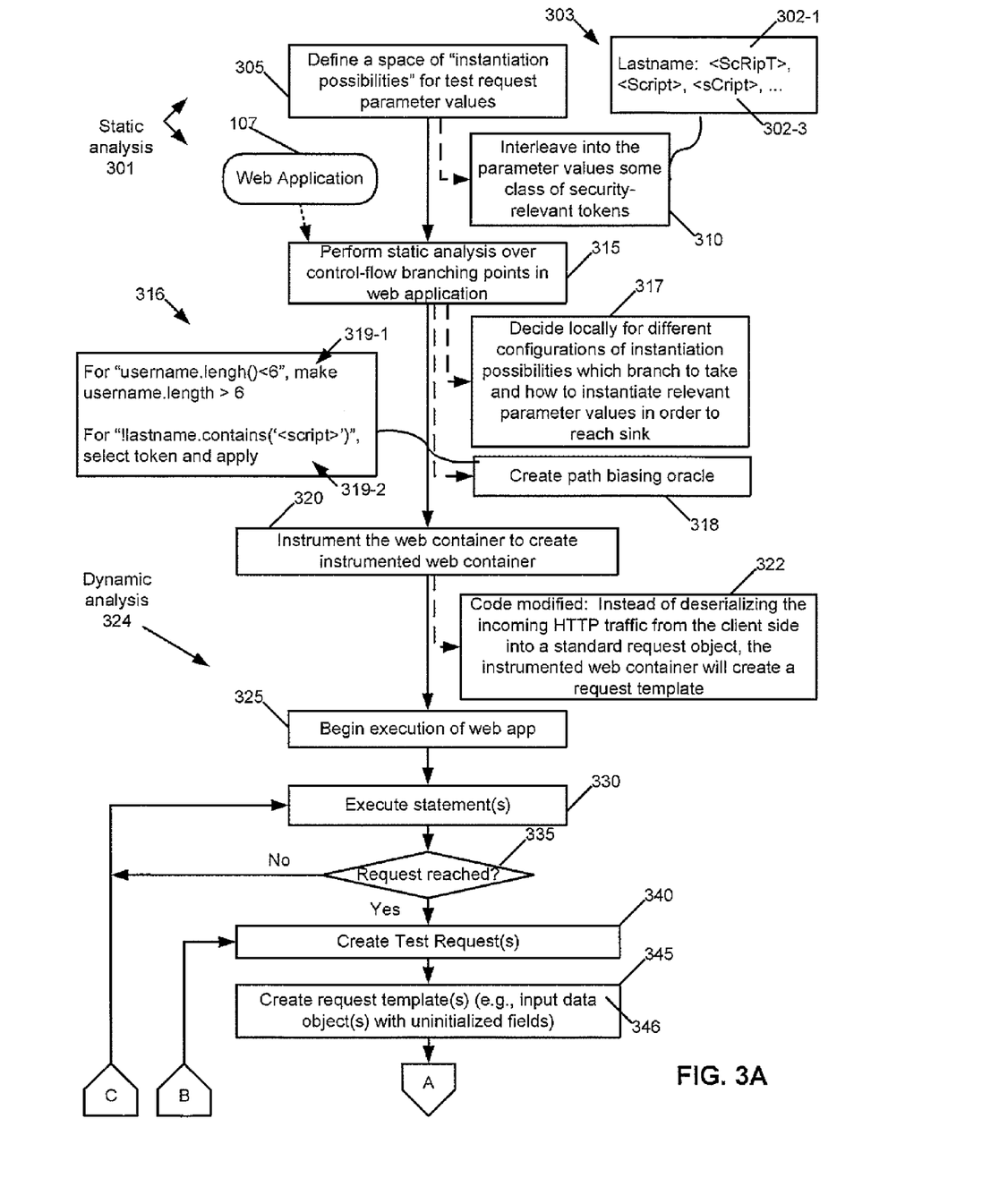
FIGS. 3A and 3B, is a logic flow diagram performed by a data flow engine for testing web applications for security vulnerabilities with metarequests, and illustrates the operation of an exemplary method, a result of execution of computer program instructions embodied on a computer readable memory, and/or functions performed by logic implemented in hardware, in accordance with an exemplary embodiment.
Figure 3B:
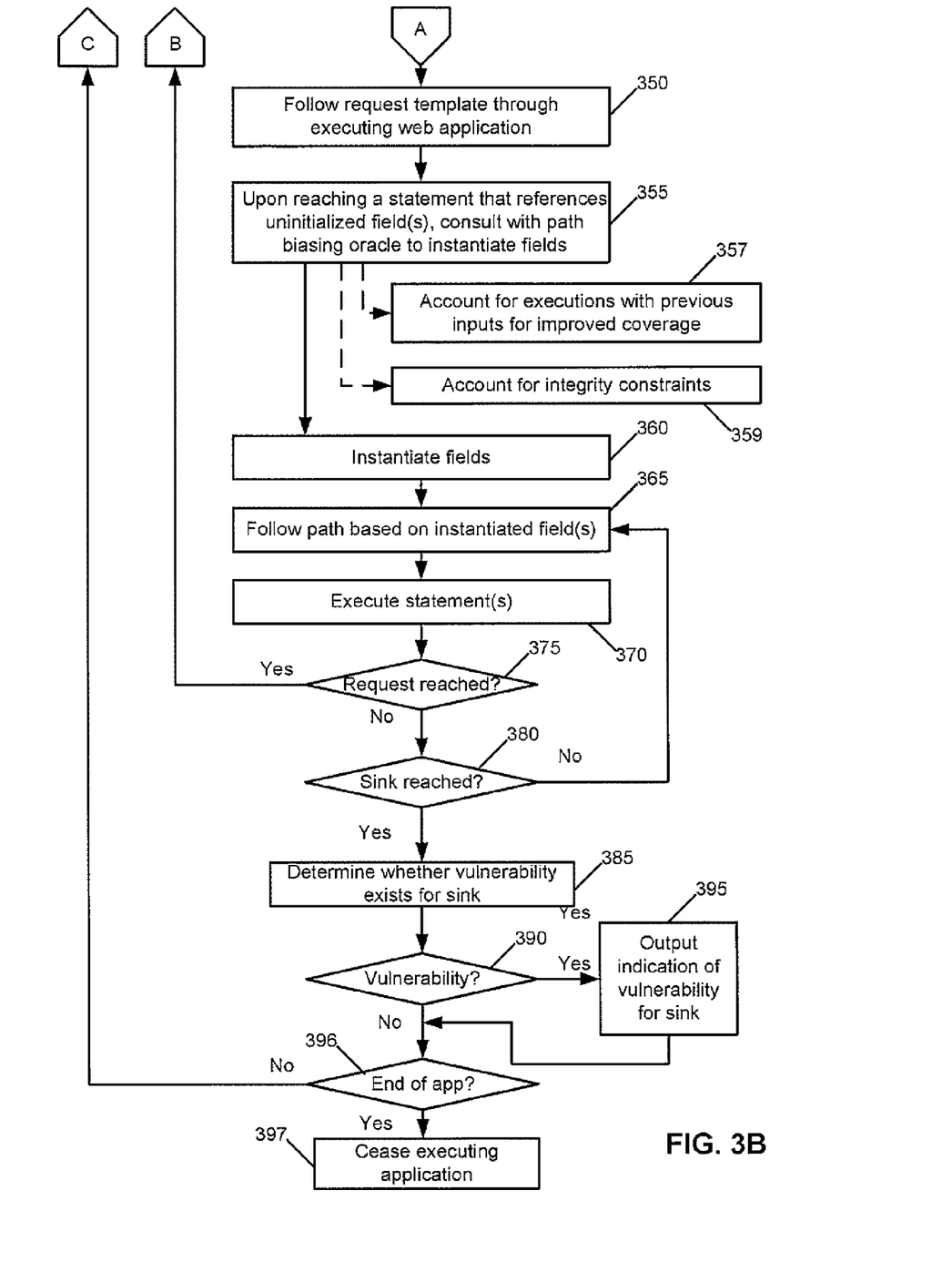

Turning to FIG. 3, including FIGS. 3A and 3B, a logic flow diagram is shown that is performed by a data flow engine for testing web applications for security vulnerabilities with metarequests. FIG. 3 illustrates the operation of an exemplary method, a result of execution of computer program instructions embodied on a computer readable memory, and/or functions performed by logic implemented in hardware, in accordance with an exemplary embodiment. The blocks in FIG. 3 may be considered to be interconnecting means for performing the functions in the blocks. The blocks in FIG. 3 are assumed to be performed by the computing system 100, e.g., under control of the security analysis tool 140.

The above code is vulnerable. There is a flow from the getParameter source reading the value of the "familyname" user-provided HTTP parameter to the PrintWriter.write sink (which renders content to the response HTML), and if the input payload contains a script block like "ScRiPT" (where the characters are not all in lower case), then the case-sensitive check over lastname (wrongly) succeeds.

In an exemplary approach, the first step is to allow a request to instantiate its parameter values (username and lastname in the example of FIG. 2) as strings of variable lengths, where some of the strings also include different variants of XSS payloads (such as <script> in different character cases). This occurs in block 305, where the computing system 100 performs the operation of defining a space of "instantiation possibilities" for test request parameter values. Block 305 is performed as part of a static analysis 301 (e.g., performed by static analysis tool 150). Static analysis 301 also includes block 315. Also, in block 310, the computing system 100 performs the operation of interleaving into the parameter values some class of security-relevant tokens. In this example, the space 303 is shown mapped to the lastname object, and three exemplary tokens 302-1 to 302-3 are shown. Since the lastname object is what will be input to the sink 250, the lastname needs a payload defined to (potentially) cause a vulnerability. That is, the security-relevant tokens would be based on and created to cause a specific vulnerability for sinks that are reached, such that tokens used for XSS would be different from tokens used for other types of vulnerabilities. XSS attacks occur when a Web application accepts data originating from a user and sends the data to another user's browser without first validating or encoding the data. Other vulnerabilities include injection flaws, the most common of which is Structured Query Language injection (SQLi), which arise when a Web application accepts input from a user and sends the input to an interpreter as part of a command or query, without first validating the input.

In block 315, the computing system 100 performs static analysis over control-flow branching points in the web application. In block 317, for instance, the computing system 100 can decide locally for different configurations of instantiation possibilities which branch to take and how to instantiate relevant parameter values in order to reach a sink 250. Another possible implementation of block 314 is block 318, where a path biasing oracle 175 is created that has a database 316 of rules 319. In an exemplary embodiment, the path biasing oracle 175 may be an object callable, e.g., by the dynamic analysis tool 165 (e.g., and/or by request templates such as input data objects described below). The path biasing oracle 175 may therefore respond to queries corresponding to, e.g., statements in the code 230 to respond with an appropriate rule 319.

This static analysis 301 detects at least the following in the example of FIG. 2:

1) the outer conditional statement ("if(username.length( )<6)") may lead to a security sink 250 if the false branch is taken, i.e., the parameter value is of length>=6;

2) the inner conditional statement ("if(!lastname.contains ('<script>')") transitions into a security sink 250 if a value not containing the exact string "<script>" is used for parameter "familyname"; and 3) the parameter "familyname" is used by the sink 250 operation.

Based on the above detected information, the path biasing oracle 175 has a database 316 that includes two rules 319. Rule 319-1 is the following: For "username.length( )<6", make username.length>6. Rule 319-2 is the following: For request of "familyname", select token and apply. It should be noted that these exemplary rules are merely for illustration and ease of description and many other options are possible.

In block 320, the computing system 100 instruments the web container 170 to create instrumented web container 171. Block 320 may or may not be part of static analysis 301. Block 320 may be performed as follows. For this instrumentation step, the behavior of the web container (say WebSphere, JBoss or Apache Tomcat) is modified (block 322) to deserialize HTTP requests into metarequests (e.g., requests 197) rather than standard request objects. In an exemplary embodiment, the metarequest is able to access metadata from the preceding static analysis, e.g., by consulting with the rules 319 (e.g., or with the path biasing oracle that consults with the rules 316 using database 319).

The rest of the blocks in FIG. 3 are part of dynamic analysis 324, e.g., performed by the computing system 100 under control of the dynamic analysis tool 165. In block 325, the computing system 100 begins execution of the web application 107. In block 330, the computing system 100 executes statements in the web application 107. If a request is not reached (block 335=No), the flow continues in block 320. If a request is reached (block 325=Yes), then a test request (or multiple test requests) are created in block 340 (e.g., by the request generator portion 155). For instance, for the statement for the source 240-1, a test request (e.g., request string 198 in FIG. 2) would be created. A corresponding metarequest, shown as request template 198, is created in block 345. It is noted that in the following flow, there is interaction between the web application 107 and the dynamic analysis tool 165. This interaction may be solely based on the input data objects 346 (e.g., metarequests) being configured to interact with the dynamic analysis tool 165, such as being able to report if a sin 250 is reached. In another exemplary embodiment, the web application 107 may be instrumented to provide this interaction. The request template 198 may be considered to be a metarequest since the template may be an input data object 346 with uninitialized fields and the fields are completed as the request template 198 is followed through the application. The input data object 346 can be followed through a path toward a sink and can interact (as described below) with the path biasing oracle 175 in order to determine, e.g., paths to take, fields to initialize, and with what to initialize the fields for corresponding statements in the web application 107. In block 350, the computing system 100 follows the request template 199 (and therefore the path(s) the application takes) through executing web application 107. In block 355, the computing system 100, upon reaching a statement that references uninitialized field(s), consults with the path biasing oracle 175 to instantiate fields. This may be performed in one example by having the input data object 346 consult the path biasing oracle 175.

Blocks 357 and 359 are possible improvements to block 355. In block 357, the computing system 100 accounts for executions with previous inputs for improved coverage. Block 357 accounts for past information, coming from previous runs, beyond the recommendations made by the static analysis for the run at hand. For instance, previous runs may have indicated that flow for a particular branch always ends at a sink with no vulnerability (or a sink with a vulnerability), but other branches are not taken in the flow. In block 357, one or more of these other branches could be taken. For instance, in the example of FIG. 2, if the return-.errorPage( ) statement (the outer conditional statement) was replaced by statement(s) ending in a sink, then there are two possible branches, one for the outer conditional statement and one for the inner conditional statement (reached via "else"). The dynamic analysis tool 165 could therefore follow one branch for one execution and another branch for another execution. One way to do this would be to augment search heuristics, e.g., so that the rules themselves could be modified or some indication stored in the rules 319 for one (previous) execution indicating which of two branches was previously taken.

In block 359, the computing system 100 accounts for integrity constraints. This block accounts for the idea that certain combinations of values for request fields may be infeasible (e.g., setting parameter "role" to "student" and parameter "age" to "3") and ensuring these combinations are not instantiated.

In block 360, the computing system 100 instantiates the field(s) based on the path biasing oracle 175. This may be accomplished in an exemplary embodiment by having the input data object 346 instantiate the field(s) based on input from the path biasing oracle 175. A path is followed in block 365 based on the instantiated fields, and additional statement(s) (if any) are executed in block 370. In block 375, the computing system 100 determines whether a request has been reached. If so (block 375=Yes), the flow proceeds to block 340. If not (block 375=No), the computing system 100 next determines whether a sink 250 has been reached in block 380. If not (block 380=No), flow proceeds to block 365. If so (block 380=Yes), block 385 is performed, where the computing system 100 determines whether there is a vulnerability for the sink 250. In an exemplary embodiment, if a sink 250 is reached with a payload having a value known to cause a vulnerability, the computing system 100 will determine there is a vulnerability. On the other hand, if a sink 250 is reached with a payload having a value known not to cause a vulnerability, the computing system 100 will determine there is a vulnerability. In the specific example of FIGS. 2 and 3, any one of the tokens 302 should cause a vulnerability if that token reaches the sink 250 of the getWriter statement. In this case, since a token (such as "<ScRipT>" 302-1) does reach the sink 250, there is a vulnerability. By contrast, if there was a method prior to the sink 205 that changed all input to lower case letters, the sink 250 (of the getWriter statement) would not be reached. If block 390=Yes, an output is made of an indication of a vulnerability for the sink in block 395. The flow proceeds to block 396. If block 390=No, flow also proceeds to block 396, where it is determined if the end of the application 107 is reached. If not (block 396=No), the flow proceeds to block 330. Otherwise (block 396=Yes), the flow proceeds to block 397, where the dynamic analysis tool 165 ceases to execute the web application 107.

Applying FIG. 3 to the code 230 of FIG. 2 (and see also FIGS. 1A and 1B), the statement for the source 240-1 causes a test request string 198 to be created (e.g., by the request generator portion 155) (block 340). The instrumented web container 171 creates the request template 198 (block 345), which gets forwarded to the web application 107. The dynamic analysis tool 165 follows this request template 199 (also referred to as a metarequest). When the metarequest arrives at the first parameter read (for source 240-1) in FIG. 2, immediately before the outer conditional statement, being asked for a value for parameter "username", in block 355, the computing system 100 consults the rules 319 previously created by the static analysis and replies with a value whose length is at least six. That is, based on the rule 319-1, the computing system 100 can determine that the username.length should be greater than six so that the application (and/or the input data object 346) proceeds along a path toward a sink (sink 250 in this example).

Next, when parameter "familyname" is requested, this process is followed again, and the computing system 100 (e.g., the metarequest as the input data object 346) again consults the static analysis, e.g., in block 365, this time replying with a token value like "ScRipT" (e.g., using rule 319-2, which has been specifically selected to cause an XSS vulnerability in the sink.

An exemplary strength of the above hybrid approach includes the following:

1) there is no reliance of a global static analysis, but rather on local hints computed by the analysis; and correspondingly, 2) the dynamic analysis can fix its behavior on-the-fly, as processing of the test request progresses, which enables usage of the local hints by the static analysis.

This goes beyond the classic hybrid model, whereby the static analysis first computes global—and thus highly approximate and imprecise—rules, and then the dynamic analysis fixes a fully concrete request and sends the request without being able to control its behavior after the request gets sent.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

instantiating, in response to a request by an executing application, an input data object with one or more uninitialized fields;

traversing a path toward a sink in the executing application to a branching point of the executing application;

providing, in response to reaching the branching point, one or more parameters for some or all of the one or more uninitialized fields of the input data object, wherein the one or more parameters were determined prior to beginning of execution of the executing application to cause a branch to be taken by the executing application toward the sink;

continuing to traverse the path toward the sink at least by following the branch in the executing application;

consulting, upon reaching a specific statement of one or more statements in the executing application that references at least one uninitialized field of the one or more uninitialized fields, a set of rules determined prior to beginning execution of the application, selecting a rule that corresponds to the specific statement and instantiating the at least one uninitialized field based on the selected rule to create at least one initialized field;

applying the at least one initialized field to the specific statement; and continuing to traverse the path toward the sink, wherein the method further comprises, prior to beginning execution of the application, defining a space of instantiation possibilities for request parameter values and placing one or more tokens in the space, wherein the one or more tokens are chosen to cause a particular vulnerability when sinks are reached; and
wherein the selected rule used in the instantiating the at least one uninitialized field comprises one of the one or more tokens.

2. The method of claim 1, further comprising determining, upon reaching the sink, whether a vulnerability exists in response to the sink performing a security-sensitive operation with a payload provided by the executing application to the sink and outputting an indication the sink is vulnerable in response to a vulnerability being determined to exist for the sink.

3. The method of claim 1, wherein instantiating the input data object with one or more uninitialized fields is performed by a web container that has been previously instrumented to deserialize incoming traffic in response to the request into a request template comprising input data object and the one or more uninitialized fields.

4. The method of claim 1, further comprising, prior to beginning execution of the application, performing a static analysis on the application, the static analysis comprising: deciding locally for different configurations of instantiation possibilities for branching possibilities in the application which branch to take for branches in the application and determining how to instantiate relevant parameter values in order to reach sinks for paths passing through branches, and creating the set of rules based at least on the deciding and determining how to instantiate.

5. The method of claim 1, wherein consulting the set of rules accounts for previous executions with previous inputs, wherein for a current execution one or more branches are selected that were not selected in a previous execution.

6. The method of claim 1, wherein consulting the set of rules further comprises accounting for integrity constraints at least by determining whether certain combinations of values used in instantiated fields may be infeasible and not instantiating those certain combinations.

7. An apparatus, comprising:
one or more memories comprising computer-readable code; and
one or more processors,
the one or more processors configured, in response to execution of the computer-readable code, to cause the apparatus to perform the following:
instantiating, in response to a request by an executing application, an input data object with one or more uninitialized fields;
traversing a path toward a sink in the executing application to a branching point of the executing application;
providing, in response to reaching the branching point, one or more parameters for some or all of the one or more uninitialized fields of the input data object, wherein the one or more parameters were determined prior to beginning of execution of the executing application to cause a branch to be taken by the executing application toward the sink;
continuing to traverse the path toward the sink at least by following the branch in the executing application;
consulting, upon reaching a specific statement of one or more statements in the executing application that references at least one uninitialized field of the one or more uninitialized fields, a set of rules determined prior to beginning execution of the application, selecting a rule that corresponds to the specific statement and instantiating the at least one uninitialized field based on the selected rule to create at least one initialized field;
applying the at least one initialized field to the specific statement; and
continuing to traverse the path toward the sink,
wherein the one or more processors are further configured, in response to execution of the computer-readable code, to cause the apparatus to perform the following: prior to beginning execution of the application, defining a space of instantiation possibilities for request parameter values and placing one or more tokens in the space, wherein the one or more tokens are chosen to cause a particular vulnerability when sinks are reached; and
wherein the selected rule used in the instantiating the at least one uninitialized field comprises one of the one or more tokens.

8. The apparatus of claim 7, wherein the one or more processors are further configured, in response to execution of the computer-readable code, to cause the apparatus to perform the following: determining, upon reaching the sink, whether a vulnerability exists in response to the sink performing a security-sensitive operation with a payload provided by the executing application to the sink and outputting an indication the sink is vulnerable in response to a vulnerability being determined to exist for the sink.

9. The apparatus of claim 7, wherein instantiating the input data object with one or more uninitialized fields is performed by a web container that has been previously instrumented to deserialize incoming traffic in response to the request into a request template comprising input data object and the one or more uninitialized fields.

10. The apparatus of claim 7, wherein the one or more processors are further configured, in response to execution of the computer-readable code, to cause the apparatus to perform the following: prior to beginning execution of the application, performing a static analysis on the application, the static analysis comprising: deciding locally for different configurations of instantiation possibilities for branching possibilities in the application which branch to take for branches in the application and determining how to instantiate relevant parameter values in order to reach sinks for paths passing through branches, and creating the set of rules based at least on the deciding and determining how to instantiate.

11. The apparatus of claim 7, wherein consulting the set of rules accounts for previous executions with previous inputs, wherein for a current execution one or more branches are selected that were not selected in a previous execution.

12. The apparatus of claim 7, wherein consulting the set of rules further comprises accounting for integrity constraints at least by determining whether certain combinations of values used in instantiated fields may be infeasible and not instantiating those certain combinations.

13. A computer program product comprising a non-transitory computer readable storage medium having program code embodied therewith, the program code executable by a computing system to cause the computing system to perform:
instantiating, in response to a request by an executing application, an input data object with one or more uninitialized fields;
traversing a path toward a sink in the executing application to a branching point of the executing application;
providing, in response to reaching the branching point, one or more parameters for some or all of the one or more uninitialized fields of the input data object, wherein the one or more parameters were determined prior to beginning of execution of the executing application to cause a branch to be taken by the executing application toward the sink;

continuing to traverse the path toward the sink at least by following the branch in the executing application;

consulting, upon reaching a specific statement of one or more statements in the executing application that references at least one uninitialized field of the one or more uninitialized fields, a set of rules determined prior to beginning execution of the application, selecting a rule that corresponds to the specific statement and instantiating the at least one uninitialized field based on the selected rule to create at least one initialized field;

applying the at least one initialized field to the specific statement; and continuing to traverse the path toward the sink, wherein the computing system is further caused to perform, prior to beginning execution of the application, defining a space of instantiation possibilities for request parameter values and placing one or more tokens in the space, wherein the one or more tokens are chosen to cause a particular vulnerability when sinks are reached; and wherein the selected rule used in the instantiating the at least one uninitialized field comprises one of the one or more tokens.

14. The computer program product of claim 13, wherein the program code is further executable by a computing system to cause the computing system to perform: determining, upon reaching the sink, whether a vulnerability exists in response to the sink performing a security-sensitive operation with a payload provided by the executing application to the sink and outputting an indication the sink is vulnerable in response to a vulnerability being determined to exist for the sink.

15. The computer program product of claim 13, wherein instantiating the input data object with one or more uninitialized fields is performed by a web container that has been previously instrumented to deserialize incoming traffic in response to the request into a request template comprising input data object and the one or more uninitialized fields.

16. The computer program product of claim 13, wherein the program code is further executable by a computing system to cause the computing system to perform: prior to beginning execution of the application, performing a static analysis on the application, the static analysis comprising: deciding locally for different configurations of instantiation possibilities for branching possibilities in the application which branch to take for branches in the application and determining how to instantiate relevant parameter values in order to reach sinks for paths passing through branches, and creating the set of rules based at least on the deciding and determining how to instantiate.

17. The computer program product of claim 13, wherein consulting the set of rules accounts for previous executions with previous inputs, wherein for a current execution one or more branches are selected that were not selected in a previous execution.

18. The computer program product of claim 13, wherein consulting the set of rules further comprises accounting for integrity constraints at least by determining whether certain combinations of values used in instantiated fields may be infeasible and not instantiating those certain combinations.

\* \* \* \* \*